United States Patent
Shimoshimano

(10) Patent No.: US 10,482,218 B2
(45) Date of Patent: *Nov. 19, 2019

(54) STORAGE MEDIUM, INFORMATION PROCESSING DEVICE, AND MANAGEMENT METHOD, FOR MANAGING TRIAL LICENSE OF APPLICATION PROGRAM

(71) Applicant: JVC KENWOOD Corporation, Yokohama-shi, Kanagawa (JP)

(72) Inventor: Hideo Shimoshimano, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 294 days.

This patent is subject to a terminal disclaimer.

(21) Appl. No.: 15/371,271

(22) Filed: Dec. 7, 2016

(65) Prior Publication Data

US 2017/0177841 A1 Jun. 22, 2017

(30) Foreign Application Priority Data

Dec. 22, 2015 (JP) ................................. 2015-249808

(51) Int. Cl.
*G06F 21/10* (2013.01)
*G06Q 50/18* (2012.01)

(52) U.S. Cl.
CPC ........... *G06F 21/105* (2013.01); *G06Q 50/18* (2013.01); *G06F 2221/0768* (2013.01)

(58) Field of Classification Search
CPC .................................................. G06F 21/105
USPC ........................................................ 726/27
See application file for complete search history.

(56) References Cited

U.S. PATENT DOCUMENTS

| | | | | |
|---|---|---|---|---|
| 5,502,839 A * | 3/1996 | Kolnick | ................ | G06F 3/0481 710/1 |
| 5,708,709 A * | 1/1998 | Rose | ........................ | G06F 8/61 380/30 |
| 8,316,091 B2 * | 11/2012 | Hirvela | ................... | H04W 4/00 709/206 |
| 2010/0036759 A1 * | 2/2010 | Ben-Yaacov | .......... | G06Q 20/10 705/30 |
| 2013/0174137 A1 * | 7/2013 | Kim | ........................ | G06F 8/65 717/171 |
| 2013/0258118 A1 * | 10/2013 | Felt | ...................... | A45D 44/005 348/207.1 |

(Continued)

FOREIGN PATENT DOCUMENTS

JP 2014-164392 A 9/2014

*Primary Examiner* — Khalil Naghdali
(74) *Attorney, Agent, or Firm* — Brundidge & Stanger, P.C.

(57) ABSTRACT

An application program can be installed in an information processing device. A determination unit determines whether the information processing device is in a state suitable for executing the application program. A management unit updates a usage state of a trial license of the application program in a case where the determination unit has determined that the information processing device is in a state suitable for operating a user interface unit. The management unit stops updating the usage state of the trial license of the application program in a case where the management unit has determined that the information processing device is not in a state suitable for executing the application program.

3 Claims, 11 Drawing Sheets

(56) References Cited

U.S. PATENT DOCUMENTS

| | | | | |
|---|---|---|---|---|
| 2015/0356279 A1* | 12/2015 | Montana | ............... | G06F 21/105 |
| | | | | 726/28 |
| 2016/0147980 A1* | 5/2016 | Yasui | ................... | G06F 21/105 |
| | | | | 726/26 |
| 2016/0378959 A1* | 12/2016 | Yuki | ................... | G06F 21/105 |
| | | | | 726/26 |

* cited by examiner

FIG. 2

| BROADCASTING STATION | POSITION INFORMATION |
|---|---|
| A1 | B1 |
| A2 | B2 |
| ⋮ | ⋮ |
| AN | BN |

| FACILITY | POSITION INFORMATION |
|----------|----------------------|
| C1 | D1 |
| C2 | D2 |
| ⋮ | ⋮ |
| CN | DN |

16

STORAGE MEDIUM, INFORMATION PROCESSING DEVICE, AND MANAGEMENT METHOD, FOR MANAGING TRIAL LICENSE OF APPLICATION PROGRAM

CROSS-REFERENCE TO RELATED APPLICATION

This application is based upon and claims the benefit of priority from the prior Japanese Patent Application No. 2015-249808, filed on Dec. 22, 2015, the entire contents of which are incorporated herein by reference.

BACKGROUND

1. Field of the Invention

The present invention relates to an evaluation technique and especially relates to a storage medium, an information processing device, and a management method for managing a trial license of an application program.

2. Description of the Related Art

Various application programs are installed and used in electronics such as a personal computer and a smart phone. A distribution form of the application programs is changing from a form by recording a file in various storage mediums to a form by downloading a file from a server via such as the Internet. An application program is distributed to many users for trial use such that users can find a highly useful application program. For example, other than an authorized version for sale, a program with a limit called "a demonstration version" is distributed. Taking convenience for a program provider and a user into consideration, it is preferable that the users use an authorized program, not a demonstration version (for example, refer to Patent Literature 1).

CITATION LIST

Patent Literature

Patent Literature: JP 2014-164392 A

In the case where a license authentication is needed when a user uses an application program, the user performs the authentication by purchasing an authorized license. On the other hand, a trial license can be issued for free for evaluation and testing. In such a case, a user purchases an authorized license after evaluating and testing the application program by using the trial license. Here, the trial license has limitations in parameters such as a trial period, an accumulated trial time, a number of times of starting. These parameters are monitored, and the application program cannot be used in the case where the parameters exceed certain values. It is preferable that the application program is not unnecessarily used such that the application program is effectively used by a trial license.

SUMMARY

To solve the above-described issue, a storage medium according to an embodiment described herein stores a program of an application capable of being installed in a computer. The storage medium stores the application program to cause the computer to execute: a step for determining whether the computer is in a state suitable for executing the application program; a step for updating a usage state of a trial license of the application program in a case where it has been determined to be suitable for executing the application program; and a step for stopping updating the usage state of the trial license of the application program in a case where it has been determined to be not suitable for executing the application program.

Another embodiment described herein is an information processing device. The device is an information processing device capable of installing an application program and includes a determination unit and a management unit. The determination unit determines whether the information processing device is in a state suitable for executing the application program. The management unit updates a usage state of a trial license of the application program in a case where the determination unit has determined that the information processing device is in a state suitable for executing the application program. The management unit stops updating the usage state of the trial license of the application program in the case where the management unit has determined to be not suitable for executing the application program.

Further, the other embodiment described herein is a management method. This method is a management method for managing a trial license of an application program capable of being installed in a computer. The management method includes: a step for determining whether the computer is in a state suitable for executing the application program; a step for updating a usage state of the trial license of the application program in a case where it has been determined to be suitable for executing the application program; and a step for stopping updating the usage state of the trial license of the application program in a case where it has been determined to be not suitable for executing the application program.

An arbitrary combination of the above-described components and expression of the embodiment converted into a method, a device, a system, a storage medium, and a computer program are effective as an aspect of the embodiment.

BRIEF DESCRIPTION OF THE DRAWINGS

FIG. 2 indicates a data structure of a table stored in a storage unit illustrated in FIG. 1;

FIG. 4 indicates a data structure of a table stored in a storage unit according to a second embodiment;

DETAILED DESCRIPTION

The invention will now be described by reference to the preferred embodiments. This does not intend to limit the scope of the present invention, but to exemplify the invention.

First Embodiment

A summary of the present invention will be described before the present invention is specifically described. A first embodiment relates to executing an application program installed in an information processing device such as a PC, a smart phone, and a tablet. Herein, a case is assumed where an application program is performed by using a trial license. In this case, although a trial period, an actual using time, and a number of times of starting have been monitored, starting and using the application program have not been limited. In this case, even if the application program is operated without fully using original functions thereof, an accumulated trial time and a number of times of starting may be wastefully consumed. For example, the case is included where the application program is started and used to reproduce a broadcasted program out of broadcast time or out of broadcast areas.

As a result, a trial period might be finished before a user fully evaluates or uses the application program. Therefore, a user has not sufficiently evaluated the application program since an accumulated trial time and a number of times of starting reach a limit even though the user does not fully use original functions of the application program. Further, since the user has not fully evaluated the application program, the user requests the trial license again or purchases an authorized license in a state that the evaluation is insufficient. In addition, a manufacturer requested from a user to issue a trial license multiple times needs to issue the trial license whenever being requested. Accordingly, the manufacturer needs to issue the trial license multiple times, and a user might permanently use the trial license.

In the embodiment, in the case where an application program is started up, it is determined whether an information processing device is in a state suitable for executing the application program, and when it is determined to be not suitable, the application program is not started. Consequently, a possibility of wastefully consuming an accumulated trial time and a number of times of starting is reduced, and the trial license can be efficiently used.

Figure 1:
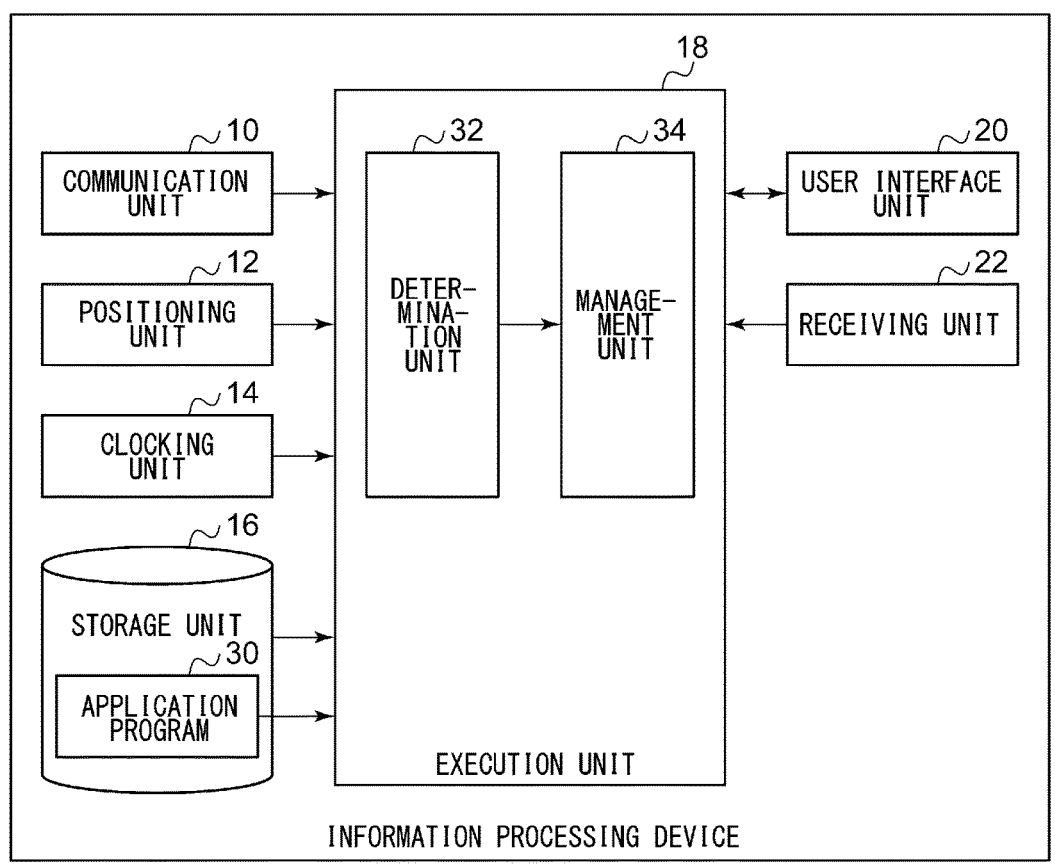
FIG. 1 is a diagram illustrating a configuration of an information processing device according to a first embodiment.

FIG. 1 indicates a configuration of an information processing device 100 according to the first embodiment. The information processing device 100 includes a communication unit 10, a positioning unit 12, a clocking unit 14, a storage unit 16, an execution unit 18, and a user interface unit 20, and a receiving unit 22. The storage unit 16 stores an application program 30, and the execution unit 18 includes a determination unit 32 and a management unit 34.

The user interface unit 20 includes a button which receives an instruction from a user and a monitor which provides information to a user. The user interface unit 20 may be formed of a touch panel, and the touch panel receives an instruction from a user and provides information to a user.

The communication unit 10 is connected to a network (not illustrated). The network may be a wired network or a wireless network. The communication unit 10 can access to a server (not illustrated) via the network can download an application program from the server. In addition, a trial license and an authorized license can be downloaded via the communication unit 10. Here, a trial license is downloaded to assume a case where an authorized license is not downloaded.

The execution unit 18 installs an application program downloaded by the communication unit 10 to the storage unit 16. Further, the execution unit 18 executes authorization processing between a server and the execution unit 18 by using a trial license downloaded in the communication unit 10. The authorization processing is executed via the communication unit 10. However, a known technique can be used, and therefore a description will be omitted here.

The storage unit 16 stores the application program 30. Here, one application program 30 is stored. However, a plurality of the application program 30 may be stored. The application program 30 is a software program which executes predetermined processing, and the predetermined processing may be arbitrary selected. An example of the application programs includes an application program to reproduce a broadcasted program, and the program is a program broadcasted on TV or a radio. Therefore, the application program is a program for viewing. In addition, the application program 30 is operable within a range of a trial license by authorization processing by the execution unit 18.

The positioning unit 12 receives a signal from a global positioning system (GPS) satellite (not illustrated) and positions a position of the information processing device 100 based on the received signal. A known technique may be used for positioning, and therefore a description will be omitted. The positioning unit 12 outputs the positioned position information (hereinafter called "position information") to the execution unit 18. The clocking unit 14 obtains a time. The time is obtained based on a signal from the GPS satellite. The clocking unit 14 outputs a time to the execution unit 18. The receiving unit 22 receives a TV broadcasting signal and a radio broadcasting signal. The receiving unit 22 demodulates the received signal and outputs the demodulated signal to the execution unit 18. A known technique may be used for processing in the receiving unit 22, and therefore a description will be omitted herein.

The determination unit 32 and the management unit 34 in the execution unit 18 are functions provided by executing the application program 30. The determination unit 32 determines whether the information processing device is suitable for executing the application program 30, in other words, for executing processing for reproducing a program. More specifically, the determination unit 32 specifies a broadcasting station broadcasting a signal receivable at the position where the information processing device 100 is disposed by referring a table stored in the storage unit 16 based on position information input from the positioning unit 12. A plurality of the broadcasting stations may be specified. FIG. 2 indicates a data structure of a table stored in the storage unit 16. FIG. 2 indicates a correspondence between a broadcasting station and a receivable range of a signal broadcasted from the broadcasting station. For example, a signal from a broadcasting station "A1" can be received within a range of position information "B1". Back to FIG. 1.

The determination unit 32 obtains a program guide of a specified broadcasting station via the communication unit 10 or the receiving unit 22. The program guide is, for example, an electronic program guide (EPG). Further, the determination unit 32 inputs a time from the clocking unit 14 and determines in the obtained program guide whether a program is broadcasted at the input time. In the case where a broadcasting station cannot be specified or in the case where a program is not broadcasted at the input time, the determination unit 32 determines that a program is not broadcasted. On the other hand, other than the cases, the determination unit 32 determines that a program is broadcasted. The determination unit 32 outputs a determination result to the management unit 34.

The management unit 34 inputs the determination result output from the determination unit 32. The management unit 34 causes the execution unit 18 to execute reproduction processing of the application program 30 in the case where it is determined that a program is broadcasted. When the reproduction processing of the application program 30 is executed, the management unit 34 updates a usage state of a trial license of the application program 30. For example, in the case where the trial license is limited by an accumulated trial time, the management unit 34 adds a trial time. Further, in the case where the trial license is limited by a number of times of starting, the management unit 34 adds a number of times of starting.

The management unit 34 does not cause the execution unit 18 to execute the reproduction processing of the application program 30 in the case where it is determined that a program is not broadcasted. If the reproduction processing of the application program 30 is not executed, the management unit 34 stops updating the usage state of the trial license of the application program 30. For example, in the case where the trial license is limited by an accumulated trial time, the management unit 34 maintains the accumulated trial time without adding. Further, in the case where the trial license is limited by a number of times of starting, the management unit 34 maintains the number of times of starting without adding.

Specifically, the management unit 34 updates the usage state of the trial license in the case where the management unit 34 has determined that the information processing device is in a state suitable for executing the reproduction processing of the application program 30. On the other hand, the management unit 34 stops updating the usage state of the trial license in the case where the management unit 34 has determined to be not suitable for executing the reproduction processing of the application program 30. In the case where the execution unit 18 has already executed the reproduction processing of the application program 30, the management unit 34 finishes the reproduction processing of the application program 30 and may stop updating the usage state of the trial license. In such a case, the management unit 34 causes the user interface unit 20 to display a message of "no broadcasting". Here, in the case where the application program 30 is executed by an authorized license, processing by the determination unit 32 and the management unit 34 may not be executed.

This configuration can be realized by hardware such as a CPU, a memory, and other LSI of an arbitrary computer and can be realized by software such as a program loaded in a memory. Herein, function blocks realized by a combination of hardware and software are envisaged. Therefore, persons skilled in the art are understood that these function blocks are realized by hardware, by software, or by a combination thereof.

Figure 3:
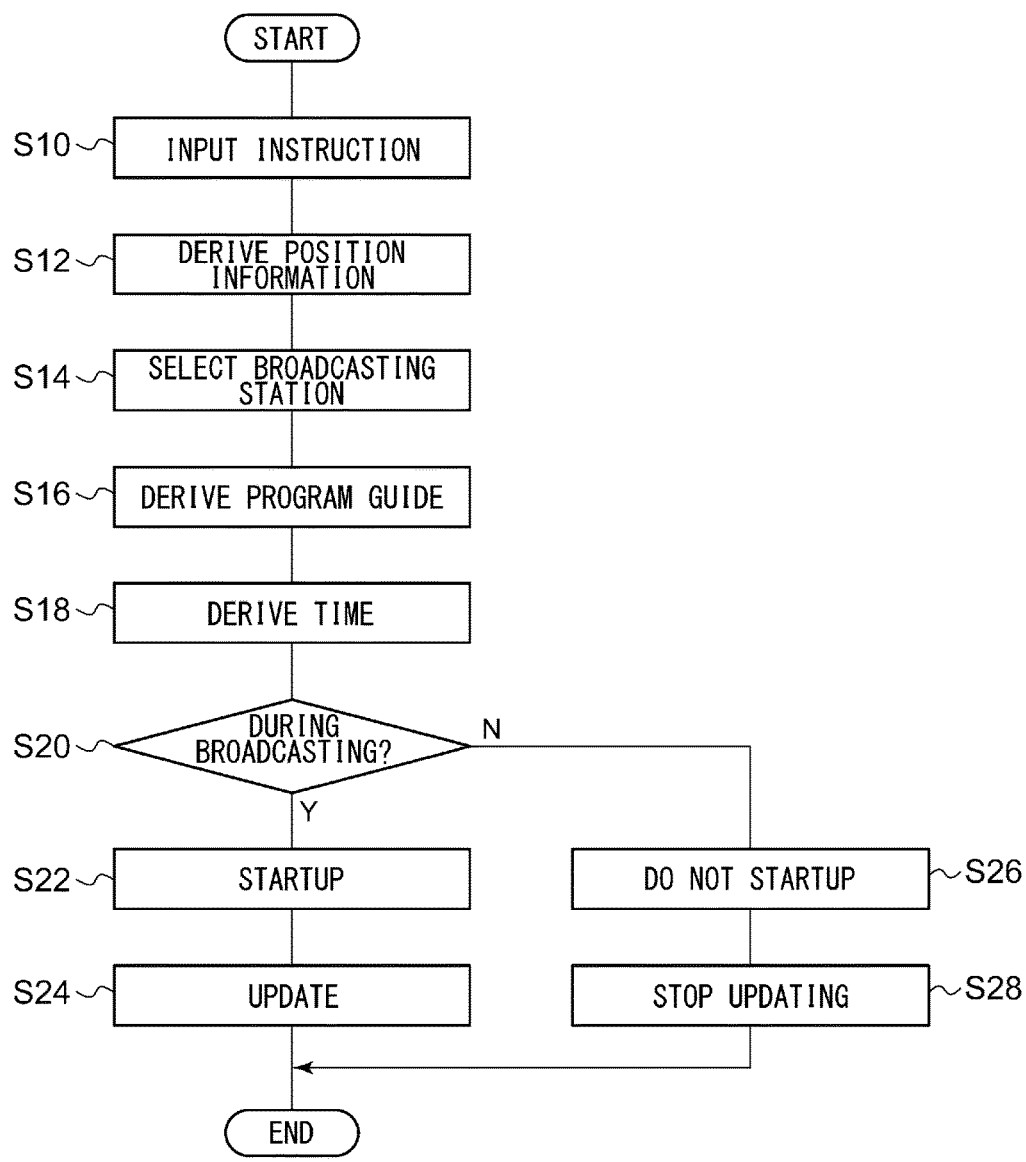
FIG. 3 is a flow chart illustrating an update procedure by the information processing device illustrated in FIG. 1.

An operation of the information processing device 100 having the above-described configuration will be described. FIG. 3 is a flow chart illustrating an update procedure by the information processing device 100. The user interface unit 20 inputs a starting instruction of the application program 30 (S10). The determination unit 32 obtains position information (S12) and selects a broadcasting station (S14). The determination unit 32 obtains a program guide (S16) and also obtains a time (S18). If a program is being broadcasted (Y in S20), the management unit 34 starts reproduction processing of the application program 30 (S22) and updates a usage state of a trial license (S24). On the other hand, if a program is not being broadcasted (N in S20), the management unit 34 does not start reproduction processing of the application program 30 (S26) and stops updating the usage state of the trial license (S28).

According to the embodiment, updating the usage state of the trial license of the application program is stopped in the case where it is determined to be not suitable for executing the application program. Therefore, unnecessary execution of the application program by a trial license can be prevented. Further, the usage state of the trial license of the application program is updated in the case where it has been determined to be suitable for executing the application program. Therefore, the trial license can be efficiently used. Further, since the trial license can be efficiently used, a manufacturer is not needed to issue the trial license multiple times. In addition, the application program is not wastefully started, and therefore a consumption power can be reduced.

Further, in the case where it has been determined that a program is broadcasted, the usage state of a trial license of an application program for reproducing the broadcasted program is updated, and therefore the trial license can be efficiently managed. Furthermore, in the case where it has been determined that a program is not broadcasted, updating the usage state of a trial license of an application program for reproducing a broadcasted program is stopped, and therefore the trial license can be efficiently managed.

Second Embodiment

A second embodiment will be described next. The second embodiment relates to an information processing device executing an application program by using a trial license as in the first embodiment. In the first embodiment, an application program for reproducing a broadcasted program is assumed. However, in the second embodiment, an application program for performing navigation is assumed. When a user is located where navigation is not needed, the application program is not needed to start. An information processing device 100 according to the second embodiment is a type as in FIG. 1, and therefore a difference will be mainly described herein.

A storage unit 16 stores an application program 30. An example of the application program includes a program for performing navigation. The application program 30 may or may not include a map data to be used in the navigation.

A determination unit 32 determines whether the information processing device 100 is in a state suitable for executing the application program 30, in other words determines whether a user is located where navigation is needed. More specifically, the determination unit 32 determines whether the information processing device 100 is located in a facility registered in advance by referring a table stored in the storage unit 16 based on position information input from a positioning unit 12. FIG. 4 indicates a data structure of a table stored in the storage unit 16 according to the second embodiment. FIG. 4 indicates a correspondence between a facility and a range of the facility. For example, a facility "C1" is provided within a range of position information "D1". An example of the facility includes such as a building and a subway. Therefore, the inside of the facility determined to be indoors. The facility may include outdoors. Back to FIG. 1.

In the case where the determination unit 32 determines that the information processing device is located where navigation is not needed in the case where the determination unit 32 determines that it is located in the facility or in the case where position information is not input from the positioning unit 12. On the other hand, the determination unit 32 determines that the information processing device is located where navigation is needed in the case where the determination unit 32 has determined that the device is located outside of the facility. In the case where the information processing device 100 includes an acceleration sensor (not illustrated), and in the case where the determination unit 32 inputs a detection result from the acceleration sensor, the determination unit 32 may use the detection result in determination. In such a case, the determination unit 32 may determine that the information processing device is located where navigation is not needed in the case where the detection result indicates that the information processing device is located in the facility and is not moving for a predetermined period. The determination unit 32 outputs a determination result to a management unit 34.

The management unit 34 inputs the determination result output from the determination unit 32. The management unit 34 causes the execution unit 18 to execute navigation processing of the application program 30 in the case where the information processing device is located where navigation is needed. When the navigation processing of the application program 30 is executed, the management unit 34 updates a usage state of a trial license of the application program 30. On the other hand, the management unit 34 does not cause the execution unit 18 to execute the navigation processing of the application program 30 in the case where the information processing device is located where navigation is not needed. If the navigation processing of the application program 30 is not executed, the management unit 34 stops updating the usage state of the trial license of the application program 30.

In the case where the execution unit 18 has already executed the navigation processing of the application program 30, the management unit 34 finishes the navigation processing of the application program 30 and may stop updating the usage state of the trial license. In such a case, the management unit 34 causes a user interface unit 20 to display a message of "navigation operation is not needed now". Here, in the case where the application program 30 is executed by an authorized license, processing by the determination unit 32 and the management unit 34 may not be executed.

Figure 5:
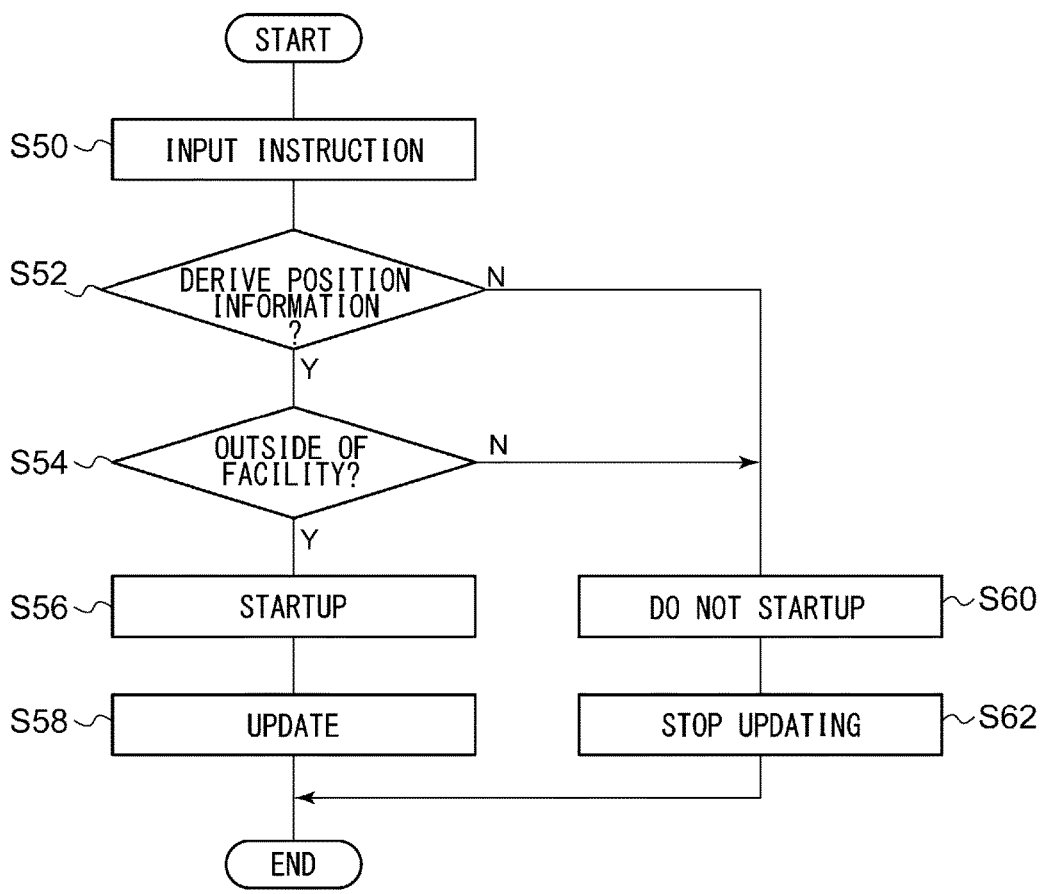
FIG. 5 is a flow chart illustrating an update procedure by an information processing device according to the second embodiment.

An operation of the information processing device 100 having the above-described configuration will be described. FIG. 5 is a flow chart illustrating an update procedure by the information processing device 100 according to the second embodiment. The user interface unit 20 inputs a starting instruction of the application program 30 (S50). The determination unit 32 obtains position information (Y in S52), and if the information processing device 100 is located outside of a facility (Y in S54), the management unit 34 starts navigation processing of the application program 30 (S56) and updates the usage state of a trial license (S58). If the determination unit 32 does not obtains position information (N in S52) or if the information processing device 100 is not located outside of a facility (N in S54), the management unit 34 does not start navigation processing of the application program 30 (S60) and stops updating the usage state of a trial license (S62).

According to the embodiment, in the case where it has been determined that the information processing device is located where navigation is not needed, updating the usage state of a trial license of an application program for performing the navigation is stopped, and an unnecessary update can be prevented. Further, in the case where it has been determined that the information processing device is located where navigation is needed, the usage state of a trial license of a program for executing the navigation is updated, and the trial license can be efficiently used.

Third Embodiment

A third embodiment will be described next. The third embodiment relates to an information processing device executing an application program by using a trial license as in the embodiments described above. In the first embodiment, an application program for reproducing a broadcasted program is assumed. However, in the third embodiment, an application program for imaging is assumed. If an information processing device does not include a lighting device and is located outside at night, it is not necessary to start the application program. Herein, a difference from the above-described embodiments will be mainly described.

Figure 6:
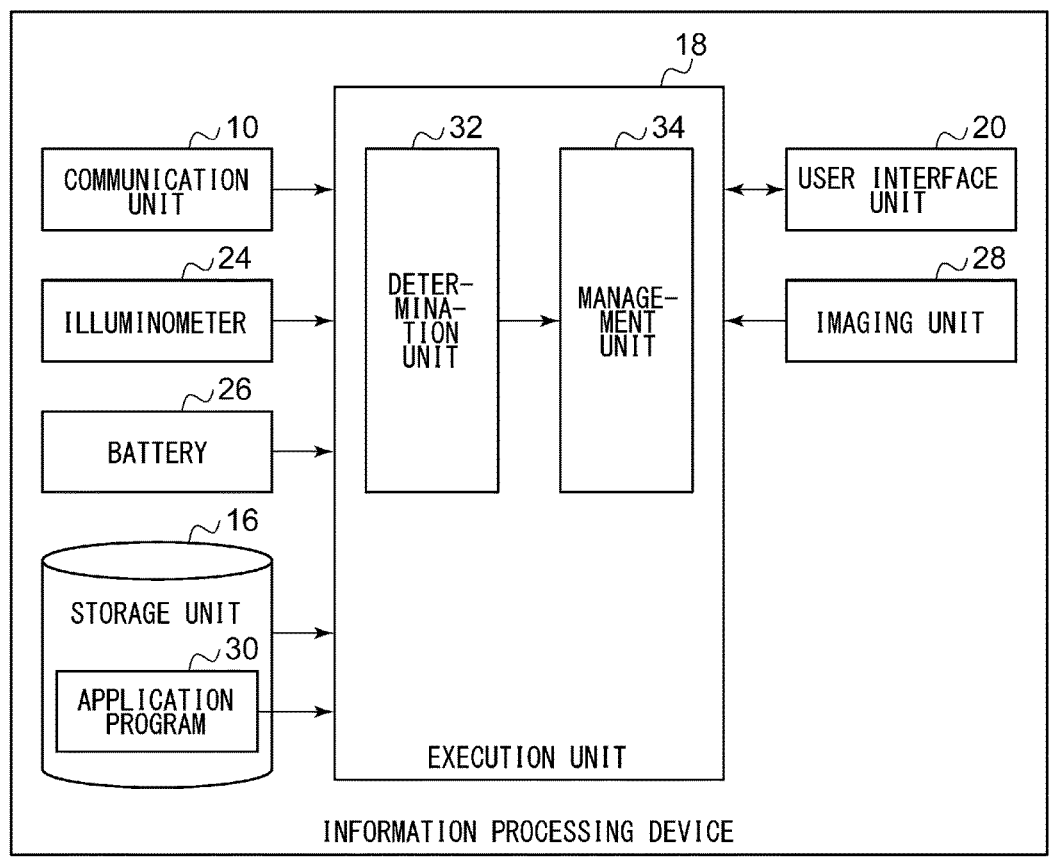
FIG. 6 is a diagram illustrating a configuration of an information processing device according to a third embodiment.

FIG. 6 indicates a configuration of an information processing device 100 according to the third embodiment. The information processing device 100 includes a communication unit 10, a storage unit 16, an execution unit 18, a user interface unit 20, an illuminometer 24, a battery 26, and an imaging unit 28. The storage unit 16 stores an application program 30, and the execution unit 18 includes a determination unit 32 and a management unit 34.

The storage unit 16 stores the application program 30. An example of the application program includes a program for imaging, and moving pictures or still pictures (hereinafter collectively called "pictures") are imaged. Further, by the application program 30, pictures may be browsed. In addition, the application program 30 is operable within a range of a trial license by authorization processing by the execution unit 18.

The illuminometer 24 measures an illuminance around the information processing device 100. A known technique may be used for measuring the illuminance, and therefore a description will be omitted. The illuminometer 24 outputs a measurement result to the execution unit 18. The battery 26 is a power source to supply power to drive the information processing device 100. The battery 26 reports a residual amount information to the execution unit 18 in accordance with an instruction from the execution unit 18. The imaging unit 28 images pictures in accordance with an instruction from the execution unit 18.

The determination unit 32 determines whether the information processing device is in a state suitable for executing the application program 30, in other words, suitable for imaging. More specifically, the determination unit 32 inputs residual amount information output from the battery 26. In the case where the residual amount is less than a threshold, the determination unit 32 determines that the information processing device is not in a state suitable for imaging. On the other hand, in the case where a residual amount is larger than or equal to a threshold, the determination unit 32 refers profile information of the information processing device 100 stored in the storage unit 16. The profile information indicates at least a list of configurations included in the information processing device 100. An example of the configurations includes a lighting device (not illustrated). The lighting device emits light in the case where a surrounding illuminance is low when the imaging unit 28 images.

The determination unit 32 confirms whether the information processing device 100 includes the lighting device by referring the profile information. In the case where the lighting device is included, it is determined that the determination unit 32 is in a state suitable for imaging. In the case where the lighting device is not included, the determination unit 32 inputs a measurement result output from the illuminometer 24. In the case where an illuminance is larger than or equal to a threshold in the measurement result, the determination unit 32 determines that the information processing device is in a state suitable for imaging. Herein, the threshold is set so as to differ from a threshold compared with a residual amount. On the other hand, in the case where an illuminance is larger than or equal to the threshold in the measurement result, the determination unit 32 determines that the information processing device is not in a state suitable for imaging. The determination unit 32 outputs a determination result to the management unit 34.

The management unit 34 inputs the determination result output from the determination unit 32. The management unit 34 causes the execution unit 18 to execute imaging processing of the application program 30 in the case where the management unit 34 determines that the information processing device is in a state suitable for imaging. When the imaging processing of the application program 30 is executed, the management unit 34 updates the usage state of a trial license of the application program 30. On the other hand, the management unit 34 does not cause the execution unit 18 to execute imaging processing of the application program 30 in the case where the management unit 34 determines to be not suitable for imaging. If the imaging processing of the application program 30 is not executed, the management unit 34 stops updating the usage state of a trial license of the application program 30.

In the case where the execution unit 18 has already executed the imaging processing of the application program 30, the management unit 34 finishes the imaging processing of the application program 30 and may stop updating the usage state of a trial license. In such a case, the management unit 34 causes the user interface unit 20 to display a message of "not ready for imaging". Here, in the case where the application program 30 is executed by an authorized license, processing by the determination unit 32 and the management unit 34 may not be executed.

Figure 7:
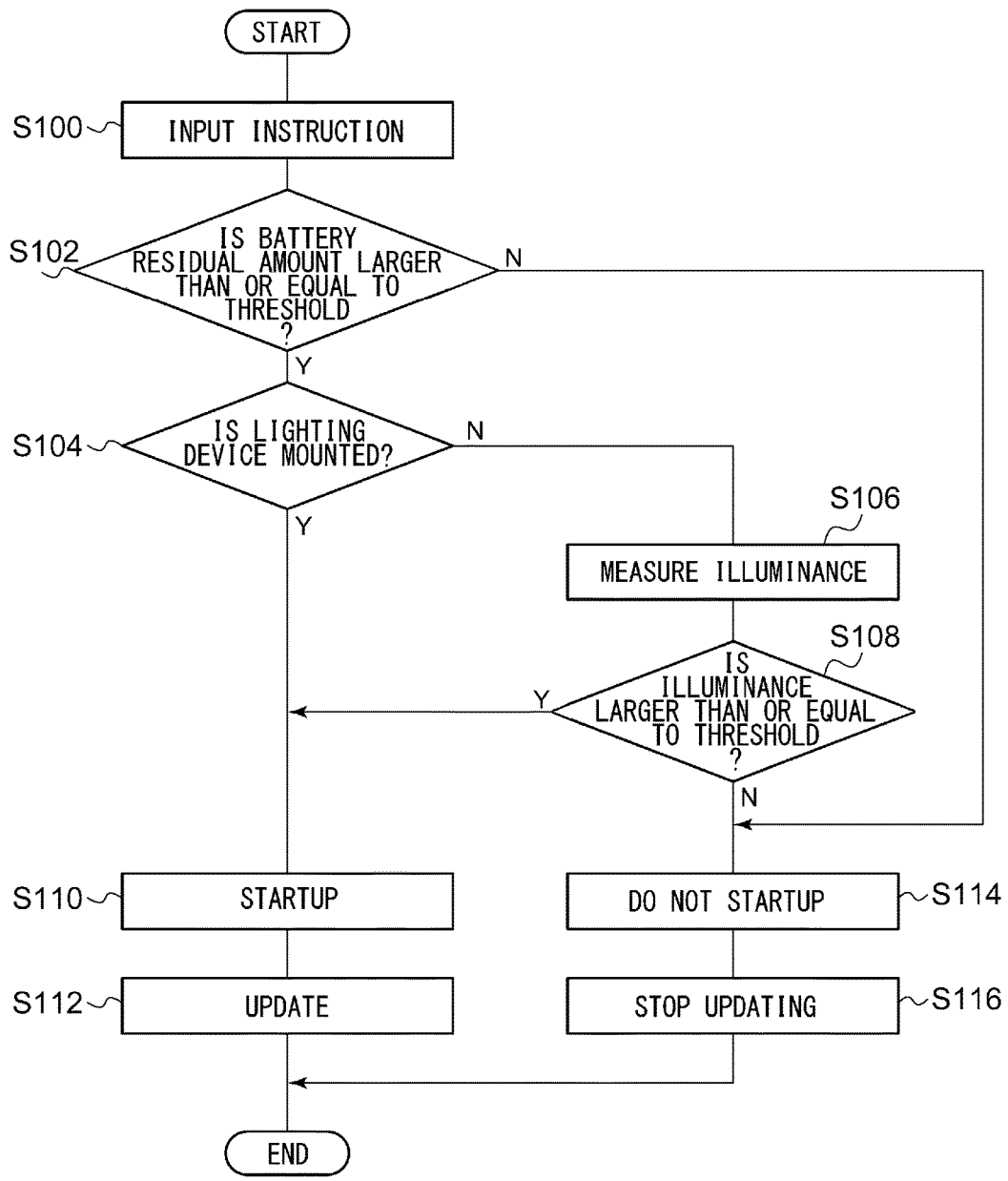
FIG. 7 is a flow chart illustrating an update procedure by the information processing device illustrated in FIG. 6.

An operation of the information processing device 100 having the above-described configuration will be described. FIG. 7 is a flow chart illustrating an update procedure by the information processing device 100. The user interface unit 20 inputs a starting instruction of the application program 30 (S100). In the determination unit 32, a residual amount of the battery 26 is larger than or equal to a threshold (Y in S102), and a lighting device is included (Y in S104), the management unit 34 starts imaging processing of the application program 30 (S110) and updates the usage state of a trial license (S112). In the determination unit 32, in the case where a residual amount of the battery 26 is not larger than or equal to a threshold (N in S102), the management unit 34 does not start the imaging processing of the application program 30 (S114) and stops updating usage state of a trial license (S116). In the case where the determination unit 32 does not include a lighting device (N in S104), the illuminometer 24 measures an illuminance (S106). In the case where the illuminance is larger than or equal to a threshold in the determination unit 32 (Y in S108), step 110 is performed. In the case where the illuminance is not larger than or equal to the threshold in the determination unit 32 (N in S108), step 114 is performed.

According to the embodiment, in the case where it has been determined that the information processing device is not in a state suitable for imaging, updating the usage state of a trial license of a program for imaging is stopped, and an unnecessary update can be prevented. Further, in the case where it has been determined that the information processing device is in a state suitable for imaging, the usage state of a trial license of a program for imaging is updated, and the trial license can be efficiently used. Further, in the case where a lighting device is included, it is determined that the information processing device is in a state suitable for imaging, and imaging can be performed in the environment ensuring brightness. Further, in the case where the lighting device is not included, and a measured illuminance is larger than or equal to a threshold, it is determined that the information processing device is in a state suitable for imaging, and therefore imaging can be performed in the environment ensuring brightness. Further, in the case where the lighting device is not included, and the measured illuminance is lower than a threshold, it is determined that the information processing device is not suitable for imaging, and therefore imaging in the environment in which brightness is not ensured can be avoided.

Fourth Embodiment

A fourth embodiment will be described next. The fourth embodiment relates to an information processing device executing an application program by using a trial license as in the embodiments described above. Further, in the fourth embodiment, an application program for imaging is assumed as in the third embodiment. Processing by a determination unit in the fourth embodiment is different from the processing in the third embodiment. Herein, a difference from the above-described embodiments will be mainly described.

Figure 8:
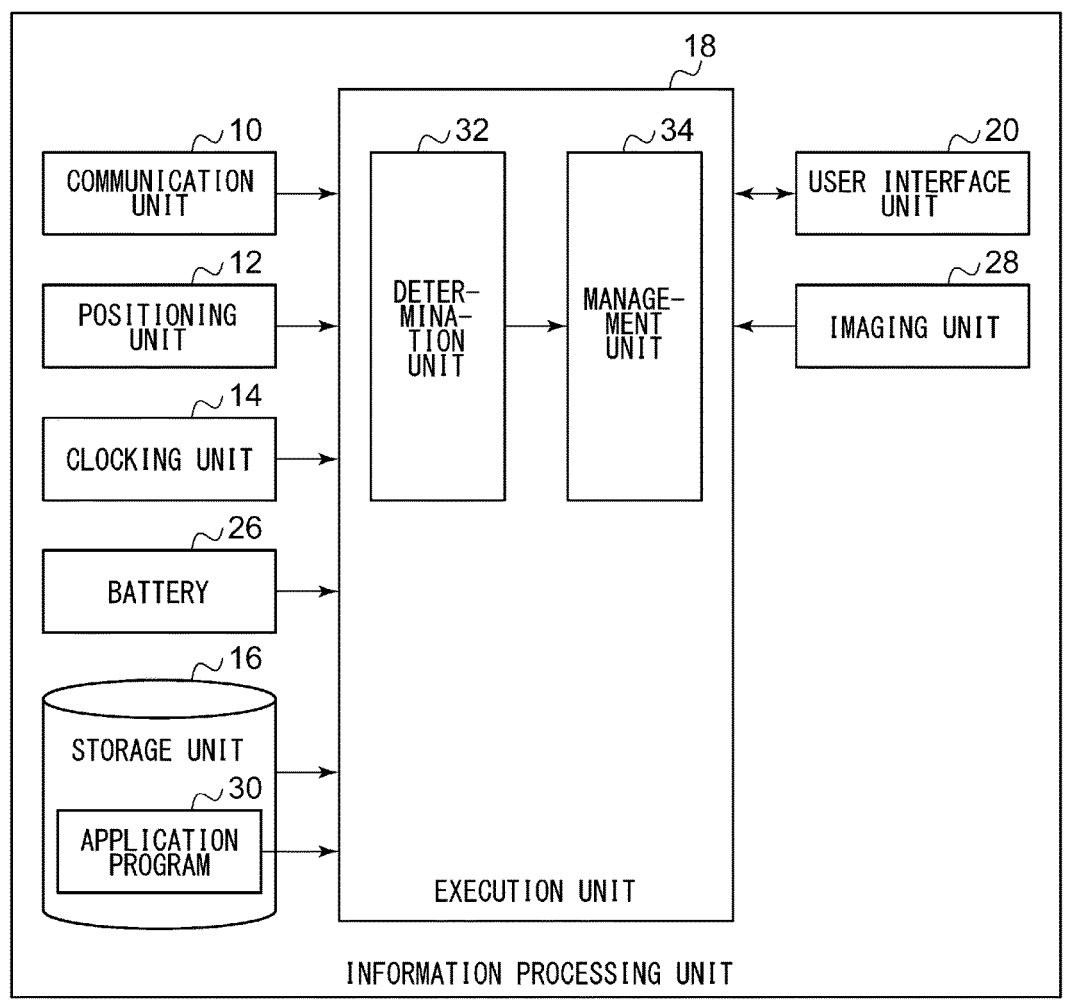
FIG. 8 is a diagram illustrating a configuration of an information processing device according to a fourth embodiment.

FIG. 8 indicates a configuration of an information processing device 100 according to the fourth embodiment. The information processing device 100 includes a communication unit 10, a positioning unit 12, a clocking unit 14, an execution unit 18, a user interface unit 20, a battery 26, and an imaging unit 28. The storage unit 16 stores an application program 30, and the execution unit 18 includes a determination unit 32 and a management unit 34.

The determination unit 32 determines whether the information processing device is in a state suitable for executing the application program 30, in other words, suitable for imaging. More specifically, the determination unit 32 inputs residual amount information output from the battery 26. In the case where the residual amount is less than a threshold, the determination unit 32 determines that the information processing device is not in a state suitable for imaging. On the other hand, in the case where a residual amount is larger than or equal to a threshold, the determination unit 32 refers profile information of the information processing device 100 stored in the storage unit 16. As described above, the profile information indicates whether a lighting device is included.

The determination unit 32 confirms whether the information processing device 100 includes the lighting device by referring the profile information. In the case where the lighting device is included, it is determined that the determination unit 32 is in a state suitable for imaging. In the case where the lighting device is not included, the determination unit 32 inputs position information output from the positioning unit 12. The determination unit 32 determines whether the information processing device 100 is located indoors or outdoors by referring to a table stored in the storage unit 16 which is a table illustrated in FIG. 4. For example, in the case where the position information output from the positioning unit 12 is included in the position information illustrated in FIG. 4, the determination unit 32 determines that the information processing device 100 is located indoors. On the other hand, in the case where the position information output from the positioning unit 12 is not included in the position information illustrated in FIG. 4, the determination unit 32 determines that the information processing device 100 is located outdoors.

In the case where the information processing device is located indoors, the determination unit 32 determines that the information processing device is suitable for imaging. On the other hand, in the case where the information processing device is located outdoors, the determination unit 32 inputs a time from the clocking unit 14. The determination unit 32 regulates a daytime period and a nighttime period and determines from the input time whether it is the daytime period or the nighttime period. In the case where the information processing device is located outdoors at the daytime period, the determination unit 32 determines that the information processing device is in a state suitable for imaging. On the other hand, in the case where the information processing device located outdoors at the nighttime period, the determination unit 32 determines that the information processing device is not suitable for imaging. The determination unit 32 outputs a determination result to the management unit 34. Processing in the management unit 34 is similar to the processing in the third embodiment. Therefore, a description thereof will be omitted herein.

Figure 9:
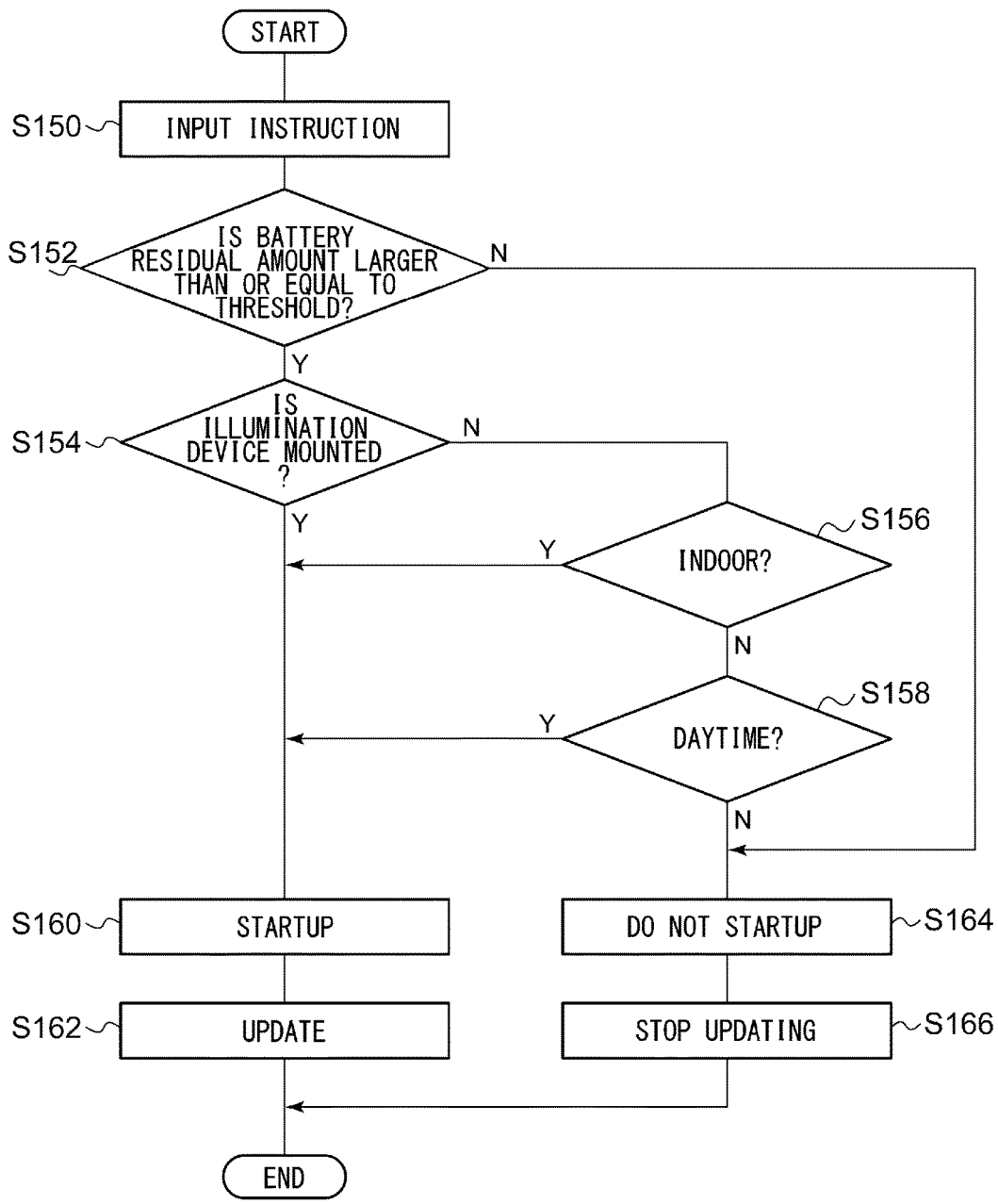
FIG. 9 is a flow chart illustrating an update procedure by the information processing device illustrated in FIG. 8.

An operation of the information processing device 100 having the above-described configuration will be described. FIG. 9 is a flow chart illustrating an update procedure by the information processing device 100. The user interface unit 20 inputs a starting instruction of the application program 30 (S150). In the determination unit 32, a residual amount of the battery 26 is larger than or equal to a threshold (Y in S152). In the case where a lighting device is included (Y in S154), the management unit 34 starts imaging processing of the application program 30 (S160) and updates a usage state of a trial license (S162). In the determination unit 32, in the case where a residual amount of the battery 26 is not larger than or equal to the threshold (N in S152), the management unit 34 does not start the imaging processing of the application program 30 (S164) and stops updating the usage state of the trial license (S166). In the case where the determination unit 32 does not include a lighting device (N in S154) and located indoors (Y in S156), step 160 is performed. In the case where the determination unit 32 is not located indoors (N in S156) and located in the daytime (Y in S158), step 160 is performed. In the case where the determination unit 32 is located in the daytime (N in S158), step 164 is performed.

According to the embodiment, in the case where the information processing device does not include a lighting device and is located indoors, it is determined that the information processing device is in a state suitable for imaging, and therefore imaging can be performed in the environment ensuring brightness. Further, in the case where the information processing device does not include the lighting device and is located outdoors in the daytime, it is determined that the information processing device is in a state suitable for imaging, and imaging can be performed in the environment ensuring brightness. Further, in the case where the information processing device does not include the lighting device and is located outdoors at the nighttime, it is determined that the information processing device is not in a state suitable for imaging, and imaging in the environment in which brightness is not ensured can be avoided.

Fifth Embodiment

A fifth embodiment will be described next. The fifth embodiment relates to an information processing device executing an application program by using a trial license as in the embodiments described above. Further, in the fifth embodiment, an application program for imaging is assumed as in the third embodiment. Processing by a determination unit in the fifth embodiment is different from the processing in the third embodiment. The information processing device 100 according to the fifth embodiment is a same type as in FIG. 8. Herein, a difference from the above-described embodiments will be mainly described.

The determination unit 32 determines whether the information processing device is in a state suitable for executing the application program 30, in other words, suitable for imaging. More specifically, in the case where a residual amount of the battery 26 is larger than or equal to a threshold, the determination unit 32 inputs position information output from the positioning unit 12. The determination unit 32 determines whether the information processing device 100 is located in a region where imaging is prohibited or a region where imaging is allowed, by referring a table stored in the storage unit 16 which is a table illustrated in FIG. 4. Here, a facility illustrated in FIG. 4 corresponds to a region where imaging is prohibited. Therefore, in the case where the position information output from the positioning unit 12 is included in the position information illustrated in FIG. 4, the determination unit 32 determines that the information processing device 100 is located in the region where imaging is prohibited and is not in a state suitable for imaging. On the other hand, in the case where the position information output from the positioning unit 12 is not included in the position information illustrated in FIG. 4, the determination unit 32 determines that the information processing device 100 is located in a region where imaging is allowed and is in a state suitable for imaging. The determination unit 32 outputs a determination result to the management unit 34. Processing in the management unit 34 is similar to the processing in the third embodiment. Therefore, a description thereof will be omitted herein.

Figure 10:
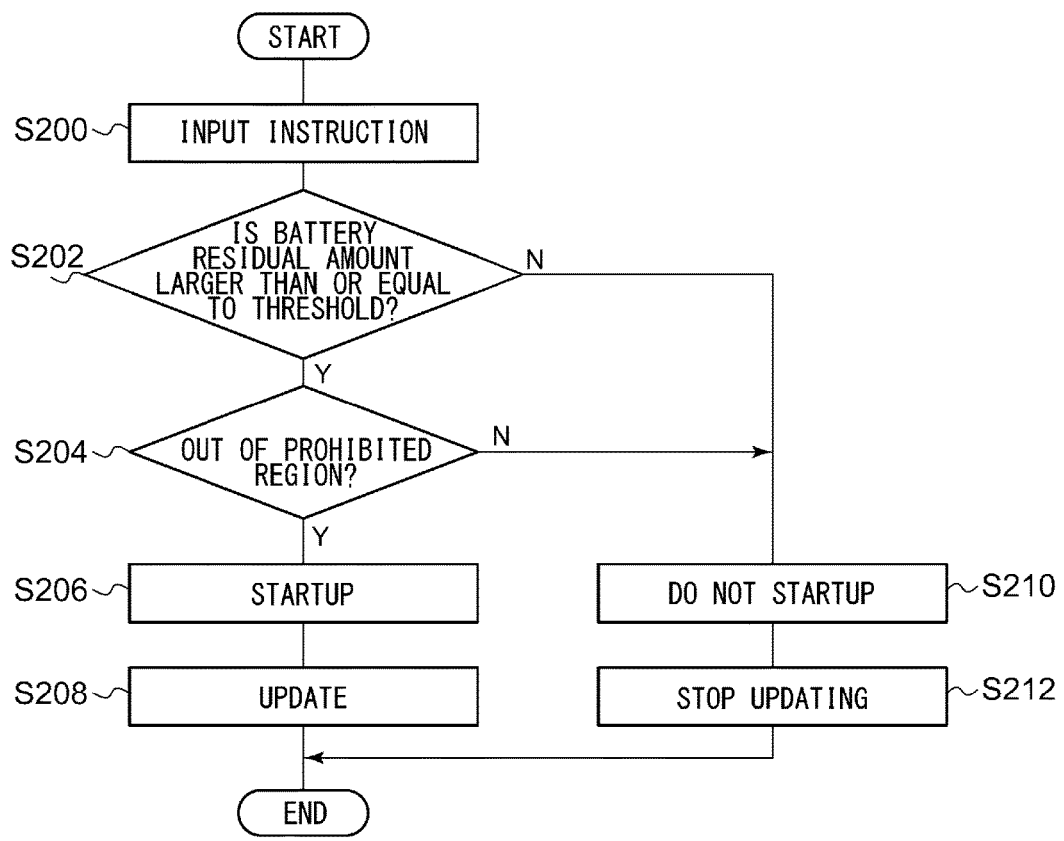
FIG. 10 is a flow chart illustrating an update procedure by an information processing device according to a fifth embodiment.

An operation of the information processing device 100 having the above-described configuration will be described. FIG. 10 is a flow chart illustrating an update procedure by the information processing device 100 according to the fifth embodiment. The user interface unit 20 inputs a starting instruction of the application program 30 (S200). In the determination unit 32, in the case where a residual amount of the battery 26 is larger than or equal to a threshold (Y in S202), and the information processing device is located outside of a prohibited region (Y in S204), the management unit 34 starts imaging processing of the application program 30 (S206) and updates a usage state of a trial license (S208). In the determination unit 32, in the case where a residual amount of the battery 26 is not larger than or equal to a threshold (N in S202), the management unit 34 does not start the imaging processing of the application program 30 (S210) and stops updating the usage state of the trial license (S212). In the case where the determination unit 32 is not located outside of the prohibited region (N in S204), step 210 is performed.

According to the embodiment, in the case where the information processing device is located in a region where imaging is prohibited, it is determined that the device is not in a state suitable for imaging, and therefore, an application program is not unnecessarily started. Further, in the case where the information processing device is located in a region where imaging is allowed, it is determined that the device is in a state suitable for imaging. Therefore, a trial license can be efficiently managed.

Sixth Embodiment

A sixth embodiment will be described next. The sixth embodiment relates to an information processing device executing an application program by using a trial license as in the embodiments described above. In the first embodiment, the application program for reproducing a broadcasted program is assumed. However, in the sixth embodiment, an application program for connecting to the Internet is assumed. If the information processing device is not connected to the Internet, it is not necessary to start an application program. An information processing device 100 according to the sixth embodiment is a same type as in FIG. 8. Herein, a difference from the above-described embodiments will be mainly described.

The storage unit 16 stores an application program 30. An example of the application program includes an application program for connecting to the Internet and a web browser. In addition, the application program 30 is operable within a range of a trial license by authorization processing by an execution unit 18.

The determination unit 32 executes the application program 30, specifically determines whether or not to connect to the Internet. More specifically, the determination unit 32 determines whether the communication unit 10 is connected to the Internet. Here, the communication unit 10 is directly or indirectly connected to the Internet. The determination unit 32 outputs a determination result to the management unit 34.

The management unit 34 inputs the determination result output from the determination unit 32. The management unit 34 causes the execution unit 18 to execute internet connection processing of the application program 30 in the case where it is determined that the communication unit 10 is connected to the Internet. When the internet connection processing of the application program 30 is executed, the management unit 34 updates the usage state of a trial license of the application program 30. On the other hand, in the case where it is determined that the communication unit 10 is not connected to the Internet, the management unit 34 does not cause the execution unit 18 to execute internet connection processing of the application program 30. If the internet connection processing of the application program 30 is not executed, the management unit 34 stops updating the usage state of a trial license of the application program 30.

Figure 11:
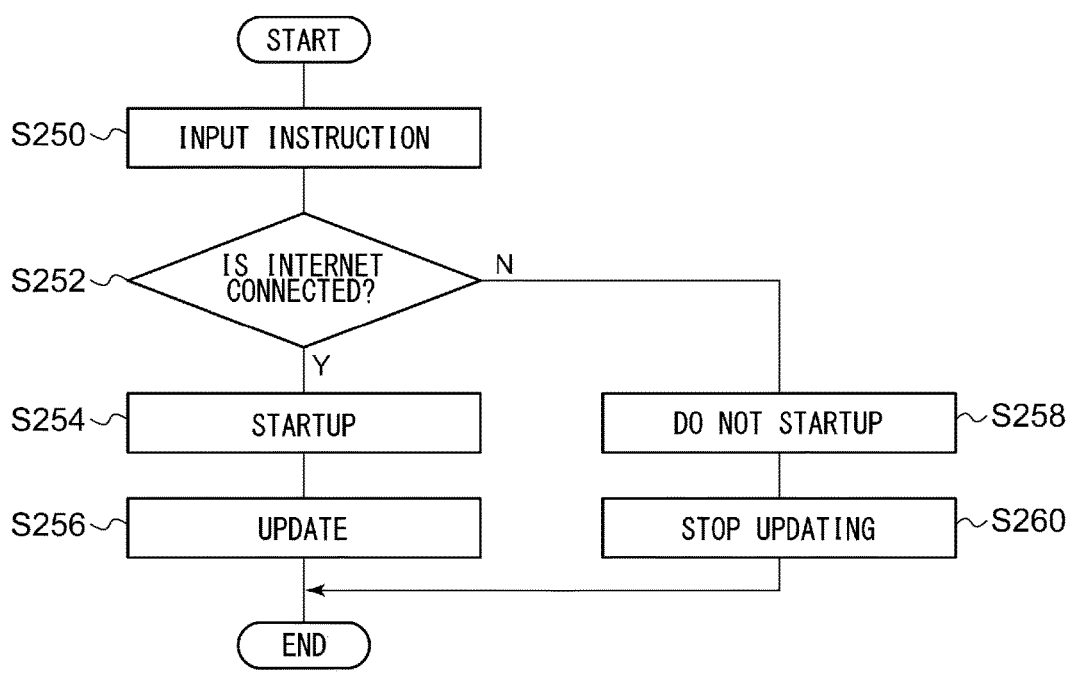
FIG. 11 is a flow chart illustrating an update procedure by an information processing device according to a sixth embodiment.

An operation of the information processing device 100 having the above-described configuration will be described. FIG. 11 is a flow chart illustrating an update procedure by the information processing device 100 according to the sixth embodiment. The user interface unit 20 inputs a starting instruction of the application program 30 (S250). In the case where the determination unit 32 is connected to the Internet (Y in S252), the management unit 34 starts the internet connection processing of the application program 30 (S254) and updates the usage state of a trial license (S256). In the case where the determination unit 32 is not connected to the Internet (N in S252), the management unit 34 does not start the internet connection processing of the application program 30 (S258) and stops updating the usage state of a trial license (S260).

According to the embodiment, in the case where it has been determined that the information processing device is not connected to the Internet, updating the usage state of a trial license of an application program for connecting to the Internet is stopped, and an unnecessary update can be prevented. Further, in the case where it has been determined that the information processing device is connected to the Internet, the usage state of a trial license of the application program for connecting to the Internet is updated, and the trial license can be efficiently used.

The present invention has been described above according to the embodiments. The embodiments are described as an example. A person skilled in the art understands that the embodiments can be varied by combination of each component and each processing of the embodiments, and such variation is within the scope of the present invention.

In the first to sixth embodiments, in the case where the management unit 34 determines that the information processing device is in a state suitable for executing the application program 30, the management unit 34 executes the application program 30 and updates the usage state of a trial license. On the other hand, the management unit 34 does not execute the application program 30 and stops updating the usage state of the trial license in the case where the management unit 34 has determined that the information processing device is not in a state suitable for the execution. However, this is not limited thereto, and the application program 30 is executed or not executed regardless of the determination result. In other words, in the case where the management unit 34 has determined that the information processing device is suitable for the execution, the management unit 34 updates the usage state of a trial license, and in the case where the management unit 34 determines that the information processing device is not in a state suitable for the execution, updating the usage state of the trial license is stopped. According to the variation, degrees of freedom of the configuration can be improved.

What is claimed is:

1. A non-transitory computer-readable storage medium storing an application program with a trial license and instructions executable by a CPU, the instructions operable to cause the CPU to:
   determine whether a function of the application program is usable for imaging;
   in response to a determination that a function of the application program is usable for imaging:
      execute the application program using the trial license, and
      add an accumulated trial time of the trial license or a number of times of starting the trial license;
   in response to a determination that the program is not usable for imaging, not add the accumulated trial time of the trial license or the number of times of starting the trial license;
   wherein the determination that the function of the application program is usable for imaging further includes at least one of:
      a lighting device is included, or
      the lighting device is not included and an illuminance measured by an illuminometer is larger than or equal to a threshold; and
   wherein the determination that the function of the application program is not usable for imaging further includes the lighting device is not included and the illuminance measured by the illuminometer is lower than the threshold.

2. A non-transitory computer-readable storage medium storing an application program with a trial license and instructions executable by a CPU, the instructions operable to cause the CPU to:

determine whether a function of the application program is usable for imaging;

in response to a determination that a function of the application program is usable for imaging:
  execute the application program using the trial license, and
  add an accumulated trial time of the trial license or a number of times of starting the trial license;

in response to a determination that the program is not usable for imaging, not add the accumulated trial time of the trial license or the number of times of starting the trial license;

wherein the determination that the function of the application program is usable for imaging further includes at least one of:
  a lighting device is included,
  the lighting device is not included and the CPU is located indoors, or
  the lighting device is not included and the CPU is located outdoors in daytime; and wherein the determination that the function of the application program is not usable for imaging further includes the lighting device is not included and the CPU is located outdoors at nighttime.

3. A non-transitory computer-readable storage medium storing an application program with a trial license and instructions executable by a CPU, the instructions operable to cause the CPU to:

determine whether a function of the application program is usable for imaging;

in response to a determination that a function of the application program is usable for imaging:
  execute the application program using the trial license,
  add an accumulated trial time of the trial license or a number of times of starting the trial license, and
  at least one of:
    include a lighting device, or
    not include the lighting device and an illuminance measured by an illuminometer is larger than or equal to a threshold; and in response to a determination that the program is not usable for imaging:
  not add the accumulated trial time of the trial license or the number of times of starting the trial license,
  locate the CPU where imaging is prohibited, and
  not include the lighting device and the illuminance measured by the illuminometer is lower than the threshold.

* * * * *